United States Patent
Hayashi

(10) Patent No.: US 9,819,217 B2
(45) Date of Patent: *Nov. 14, 2017

(54) ELECTRONIC DEVICE, DISPLAY METHOD IN ELECTRONIC DEVICE, AND NON-TRANSITORY COMPUTER READABLE RECORDING MEDIUM

(71) Applicant: KYOCERA CORPORATION, Kyoto (JP)

(72) Inventor: Takuya Hayashi, Kirishima (JP)

(73) Assignee: KYOCERA CORPORATION, Kyoto (JP)

(*) Notice: Subject to any disclaimer, the term of this patent is extended or adjusted under 35 U.S.C. 154(b) by 0 days.

This patent is subject to a terminal disclaimer.

(21) Appl. No.: 15/272,195

(22) Filed: Sep. 21, 2016

(65) Prior Publication Data

US 2017/0012460 A1 Jan. 12, 2017

Related U.S. Application Data

(63) Continuation of application No. PCT/JP2015/059328, filed on Mar. 26, 2015.

(30) Foreign Application Priority Data

Mar. 26, 2014 (JP) .................... 2014-064355

(51) Int. Cl.
*H02J 7/02* (2016.01)
*H02J 50/10* (2016.01)
(Continued)

(52) U.S. Cl.
CPC ............ *H02J 7/025* (2013.01); *H02J 7/0045* (2013.01); *H02J 7/0047* (2013.01); *H02J 50/10* (2016.02); *H04M 1/73* (2013.01); *H04M 1/72522* (2013.01)

(58) Field of Classification Search
CPC ........ H02J 50/10; H02J 7/0045; H02J 7/0047; H02J 7/025
See application file for complete search history.

(56) References Cited

U.S. PATENT DOCUMENTS 8,489,315 B2 7/2013 Yamamoto
9,154,606 B2 10/2015 Tseng et al.
(Continued)

FOREIGN PATENT DOCUMENTS

JP 2003-134699 5/2003
JP 2006-311712 11/2006
(Continued)

OTHER PUBLICATIONS

International Search Report in International Application No. PCT/JP2015/059328, dated Jun. 2, 2015, in 2 pages.
(Continued)

*Primary Examiner* — Tuan Pham
(74) *Attorney, Agent, or Firm* — Duane Morris LLP

(57) ABSTRACT

An electronic device, a display method in an electronic device, and a non-transitory computer readable recording medium are disclosed. A charging coil generates induced electromotive force by interlinkage of a magnetic field from an external charger coil with the charging coil. A battery is to be charged with the induced electromotive force. A display includes a display region, a position that coincides with the center of the charging coil being located inside an outline of the display region in plan view. At least one processor displays, in the display region, a charging screen including information that indicates the center of the charging coil in the position when an operation is performed on the operation unit while the battery is charged with the induced electromotive force.

9 Claims, 13 Drawing Sheets

(51) Int. Cl.
*H02J 7/00* (2006.01)
*H04M 1/73* (2006.01)
*H04M 1/725* (2006.01)

(56) References Cited

U.S. PATENT DOCUMENTS

| | | | |
|---|---|---|---|
| 9,171,139 B2 | 10/2015 | Newel | |
| 9,191,486 B2 | 11/2015 | Tseng et al. | |
| 2012/0043931 A1 | 2/2012 | Terao et al. | |
| 2012/0052923 A1* | 3/2012 | Park | H02J 7/025 455/567 |
| 2012/0316811 A1 | 12/2012 | Choi et al. | |
| 2013/0145448 A1 | 6/2013 | Newell | |
| 2014/0306646 A1* | 10/2014 | Liu | H02J 7/025 320/103 |
| 2016/0042162 A1 | 2/2016 | Newell | |
| 2016/0080551 A1 | 3/2016 | Tseng et al. | |

FOREIGN PATENT DOCUMENTS

| | | |
|---|---|---|
| JP | 2010-172185 | 8/2010 |
| JP | 2011-516936 | 5/2011 |
| JP | 2012-065537 | 3/2012 |
| JP | 2013-215036 | 4/2012 |
| JP | 2014-027738 | 7/2012 |
| JP | 2013-005432 | 1/2013 |
| WO | 2013/022849 A1 | 2/2013 |
| WO | 2013/136394 A1 | 9/2013 |

OTHER PUBLICATIONS

Written Opinion of the International Searching Authority in International Application No. PCT/JP2015/059328, dated Jun. 2, 2015, in 6 pages.

Official Action in Japanese Patent Application No. 2014-064355, dated Mar. 28, 2017, and Statement of Relevance of Non-English References Therein, in 7 pages.

Official Action dated Jun. 13, 2017 in counterpart Japanese Patent Application No. 2014-064355 with Statement of Relevance of Non-English References.

* cited by examiner

F I G. 1 3
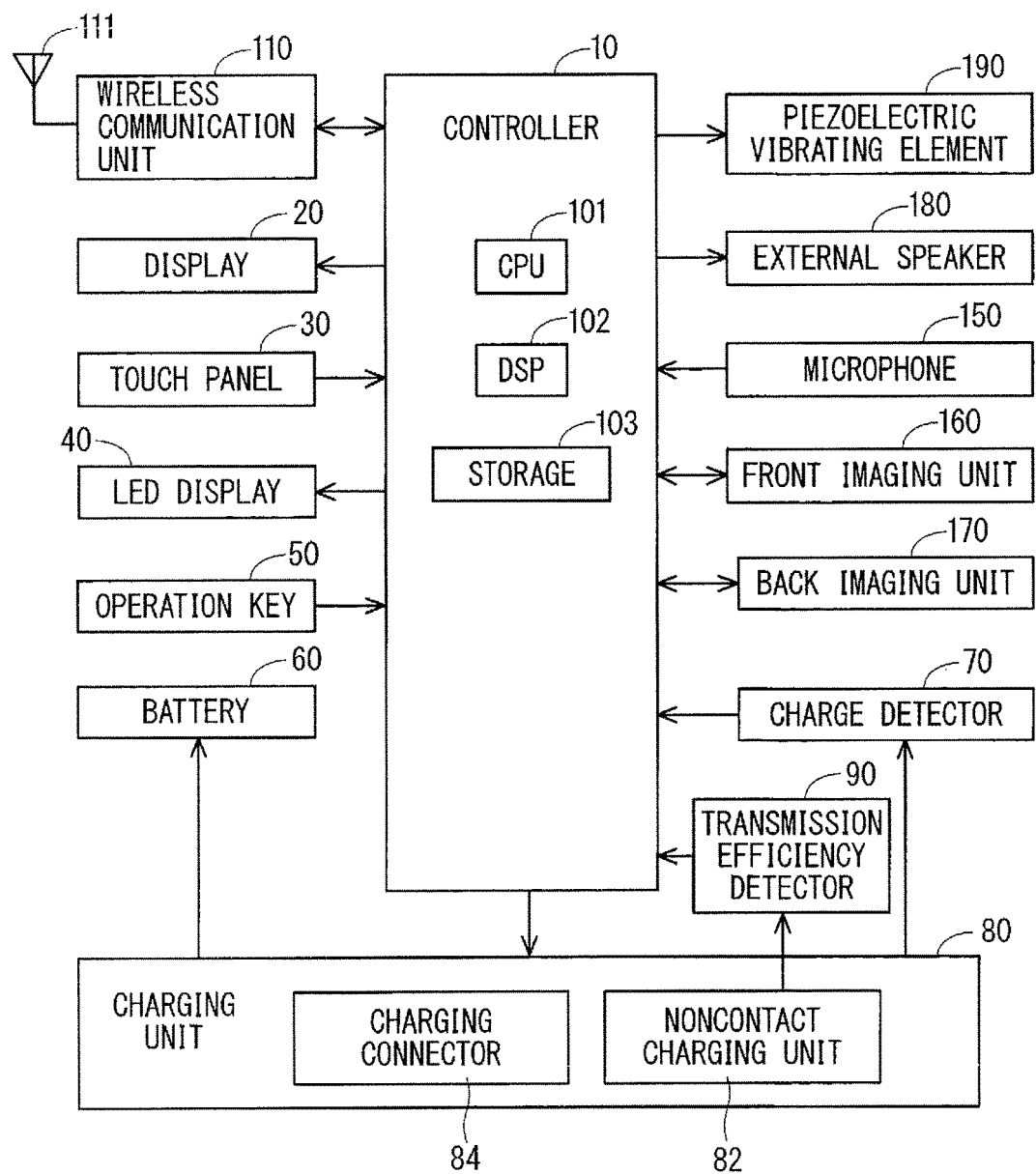

ELECTRONIC DEVICE, DISPLAY METHOD IN ELECTRONIC DEVICE, AND NON-TRANSITORY COMPUTER READABLE RECORDING MEDIUM

CROSS-REFERENCE TO RELATED APPLICATION

The present application is a continuation based on PCT Application No. PCT/JP2015/059328 filed on Mar. 26, 2015, which claims the benefit of Japanese Application No. 2014-064355, filed on Mar. 26, 2014. PCT Application No. PCT/JP2015/059328 is entitled "ELECTRONIC DEVICE AND DISPLAY METHOD IN ELECTRONIC DEVICE", and Japanese Application No. 2014-064355 is entitled "ELECTRONIC DEVICE AND DISPLAY METHOD IN ELECTRONIC DEVICE". The contents of which are incorporated by reference herein in their entirety.

FIELD

Embodiments of the present disclosure relate to an electronic device, a display method in an electronic device, and a non-transitory computer readable recording medium.

BACKGROUND

Various technologies have conventionally been proposed for electronic devices including coils. For example, a battery is charged with induced electromotive force generated in a first coil. A magnetic flux from a second coil located in an external charger is interlinked with the first coil, to thereby generate the induced electromotive force in the first coil.

The electronic device includes a display to display various pieces of information for a user.

SUMMARY

An electronic device, a display method in an electronic device, and a non-transitory computer readable recording medium are disclosed. In one embodiment, an electronic device comprises a charging coil, a battery, a display, an operation unit, and at least one processor. The charging coil generates induced electromotive force by interlinkage of a magnetic field from an external charger coil with the charging coil. The battery is to be charged with the induced electromotive force. The display includes a display region. A position that coincides with the center of the charging coil is located inside an outline of the display region in plan view. At least one processor displays, in the display region, a charging screen including first information that indicates the center of the charging coil in the position when an operation is performed on the operation unit while the battery is charged with the induced electromotive force.

In another embodiment, an electronic device comprises a charging coil, a battery, a display, and an operation unit. The charging coil generates induced electromotive force by interlinkage of a magnetic field from an external charger coil with the charging coil. The battery is to be charged with the induced electromotive force. The display includes a display region. A position that coincides with the center of the charging coil is located inside an outline of the display region in plan view. A display method in an electronic device comprises displaying, in the display region, a charging screen including a letter or a figure that indicates the center of the charging coil in the position when an operation is performed on the operation unit while the battery is charged with the induced electromotive force.

In another embodiment, a non-transitory computer readable recording medium stores a control program that executes a first step in an electronic device. The electronic device comprises a charging coil, a battery, a display, and an operation unit. The charging coil generates induced electromotive force by interlinkage of a magnetic field from an external charger coil with the charging coil. The battery is to be charged with the induced electromotive force. The display includes a display region. A position that coincides with the center of the charging coil is located inside an outline of the display region in plan view. In the first step, a charging screen including a letter or a figure that indicates the center of the charging coil in the position is displayed in the display region when an operation is performed on the operation unit while the battery is charged with the induced electromotive force.

BRIEF DESCRIPTION OF THE DRAWINGS

FIG. 13 illustrates a block diagram schematically showing one example of an electrical configuration of an electronic device.

DETAILED DESCRIPTION

First Embodiment

<External Appearance of Electronic Device>

Figure 1:
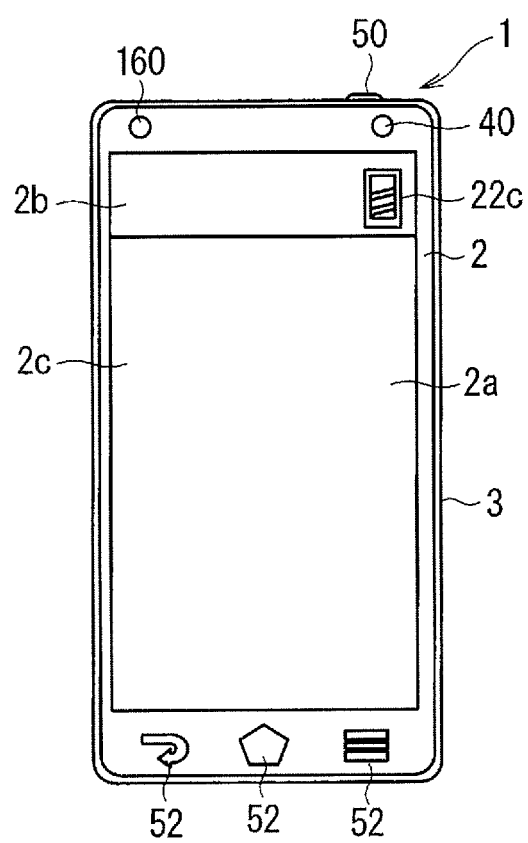
FIG. 1 illustrates a front view showing an external appearance of an electronic device according to one embodiment.

FIG. 1 illustrates a front view showing an external appearance of an electronic device 1 according to a first embodiment. The electronic device 1 according to the first embodiment is, for example, a mobile phone such as a smart phone and allows for communication with another communication device via a base station and a server. The electronic device 1 can perform telephone calls or e-mail messages, for example.

As illustrated in FIG. 1, the electronic device 1 may have a substantially rectangular plate shape in plan view. As illustrated in FIG. 1, an exterior surface (surface) of the electronic device 1 includes a cover panel 2 and a case 3.

The cover panel 2 has a substantially rectangular plate shape in plan view, for example. As illustrated in FIG. 1, the cover panel 2 includes a front portion of the electronic device 1 except for a peripheral portion of the front portion. The cover panel 2 may have a planar shape as illustrated in FIG. 1, or may have a curved shape.

The cover panel 2 is made of a transparent material. For example, transparent sapphire, transparent glass, or transparent acrylic resin may be used as the material for the cover panel 2. Various pieces of information such as letters, symbols, figures, and videos displayed in a display region 2*a* of a display, which will be described below, are visually identified by a user through the cover panel 2. A peripheral region surrounding the display region 2*a* is black because of, for example, a film bonded to the peripheral region. Thus, a display by the display is not easily visually identified by the user through the peripheral region.

As illustrated in FIG. 1, a front imaging unit 160 is located in an upper end portion of the cover panel 2. A touch panel, which will be described below, is bonded to an inner main surface of the cover panel 2 (a main surface inside the electronic device 1). The user can provide various instructions to the electronic device 1 by operating the display region 2*a* with an operator (such as a finger).

The case 3 includes the peripheral portion of the front portion, a side portion, and a back portion of the electronic device 1. The case 3 is made of resin, for example. For example, polycarbonate resin, ABS resin, or nylon resin is used as the resin for forming the case 3. The case 3 may comprise only one member, or may comprise a combination of a plurality of members.

As illustrated in FIG. 1, an operation key 50 is located on the side portion (for example, an upper side-surface portion) of the electronic device 1. The operation key 50 is pressed by the user to start the electronic device 1 or stop the functions of the electronic device 1, for example. The operation key 50 is, for example, a hardware key. FIG. 1 illustrates the operation key 50 that protrudes upward in order to make it easy to see the operation key 50. Thus, the operation key 50 may be buried in the side portion of the electronic device 1. In other words, the surface of the operation key 50 may be located inside the surface of the side portion of the electronic device 1. This can prevent the operation key 50 from being unintentionally contacted with an external member and being pressed (namely, an operating error). The other diagrams illustrate the electronic device 1 that includes the operation key 50 buried in the side portion.

FIG. 1 also illustrates an operation key 52 as a hardware key. The user operates the operation key 52 to perform processes in response to the operation key 52. The operation key 52 may be a software key.

FIG. 1 also illustrates a pictographic display region 2*b* located in part (for example, an upper portion) of the display region 2*a*. Time and figures that indicate a state of radio waves, a charge amount of battery (remaining battery life), or various settings (such as a silent mode) are displayed in the pictographic display region 2*b*. FIG. 1 illustrates a FIG. 22*c* that indicates the charge amount of the battery. A home screen (not shown) is displayed by a main program, for example, in a main region 2*c* except for the pictographic display region 2*b*. For example, icons of various application programs are displayed on the home screen. When the touch panel detects an operation performed on an icon by the user, an application program corresponding to the operated icon is executed. Consequently, a display screen in response to the application program is displayed in the display region 2*a*. Examples of the application program include a phone application, an e-mail application, and an Internet browser application.

An LED display 40 is also located in the upper end portion of the cover panel 2. The LED display 40 has a light-emitting element (such as an light-emitting diode (LED)), and the LED display 40 can inform the user of various pieces of information by light emitted from the light-emitting element. For example, the light is emitted from the light-emitting element when a call has been missed or an e-mail message has been unread. This encourages the user to operate the electronic device 1. Alternatively, the electronic device 1 includes a battery, which will be described below, and the light is emitted from the light-emitting element while the battery is charged, to thereby display that the battery is put on charge for the user. A notification of the missed call is preferably distinguished from a display during the charge time by light-emitting modes (flashing/glowing or luminescent colors) of the light-emitting element, for example.

<Electrical Configuration of Electronic Device>

Figure 2:
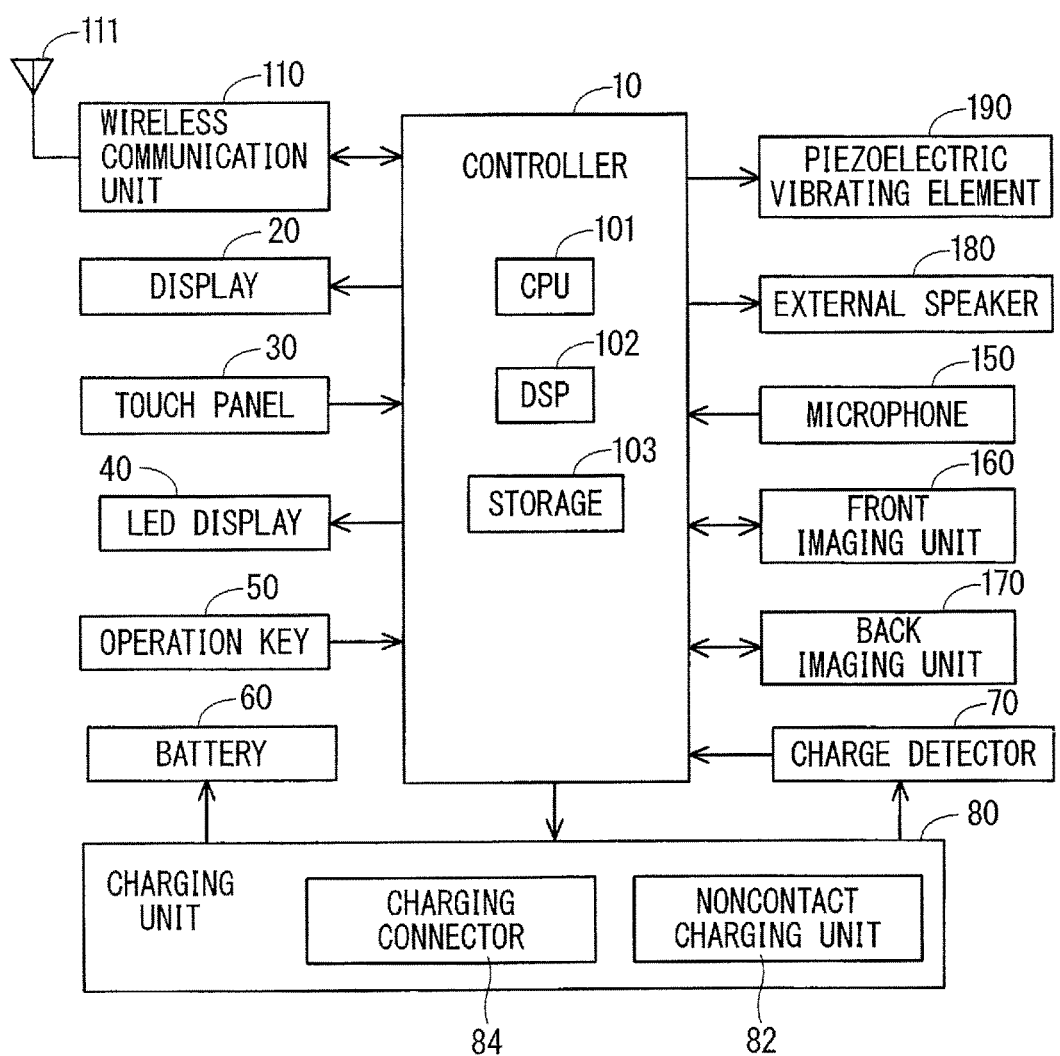
FIG. 2 illustrates a block diagram schematically showing one example of an electrical configuration of the electronic device.

FIG. 2 illustrates a block diagram showing an electrical configuration of the electronic device 1. As illustrated in FIG. 2, the electronic device 1 includes a controller 10, a wireless communication unit 110, a display 20, a touch panel 30, the LED display 40, the operation key 50, a battery 60, a charge detector 70, a charging unit 80, a microphone 150, the front imaging unit 160, a back imaging unit 170, a speaker 180, and a piezoelectric vibrating element 190. The electronic device 1 includes these structural components housed in the case 3 of the electronic device 1.

The controller 10 includes a central processing unit (CPU) 101, a digital signal processor (DSP) 102, and a storage 103. The controller 10 can collectively manage the actions of the electronic device 1 by controlling the other structural components of the electronic device 1. The storage 103 includes a read only memory (ROM) and a random access memory (RAM). The storage 103 can store a plurality of application programs (programs such as telephone calls, e-mail messages, and the Internet) and a main program that is a control program for controlling the electronic device 1, and specifically, a control program for controlling each of the structural components such as the wireless communication unit 110 and the display 20 of the electronic device 1. Various functions of the controller 10 are achieved by the CPU 101 and the DSP 102 that execute various programs in the storage 103.

The wireless communication unit 110 includes an antenna 111. The wireless communication unit 110 can transmit and receive communication signals to and from a mobile phone other than the electronic device 1 or a communication device such as a web server connected to the Internet by using the antenna 111 via the base station.

The display 20 is a liquid crystal display or an organic electro luminescent (EL) display, for example. As described above, various pieces of information displayed by the display 20 are visually identified from the outside of the electronic device 1 through the display region 2*a*.

The touch panel 30 is a projected capacitive touch panel, for example. The touch panel 30 is bonded to the inner main surface of the cover panel 2. The touch panel 30 includes two sheet-shaped electrode sensors facing each other. When the user contacts the display region 2a with the operator such as a finger, capacitance of a portion of the touch panel 30 facing the operator is changed. Then, the touch panel 30 can output an electrical signal according to the change in the capacitance to the controller 10. In this manner, the touch panel 30 can detect the contact of the operator with the display region 2a.

The operation key 50 when being pressed can output an electrical instruction signal to the controller 10. The operation key 50 and the touch panel 30 are common to each other since both of them accept the operation of the electronic device 1. The operation key 50 and the touch panel 30 each correspond to one example of an operation unit in the section of the summary.

A voice of the user during a telephone call is input to the microphone 150 that can convert the input sound into an electrical signal to output the electrical signal to the controller 10. The speaker 180 converts the electrical sound signal input from the controller 10 into a sound to output the sound, so that the speaker 180 can provide a ringer to the user located at a distance from the electronic device 1.

The piezoelectric vibrating element 190 is bonded to the inner main surface of the cover panel 2. The piezoelectric vibrating element 190 is vibrated by a drive voltage applied from the controller 10. The controller 10 generates the drive voltage on the basis of a sound signal and applies the drive voltage to the piezoelectric vibrating element 190. The piezoelectric vibrating element 190 is vibrated by the controller 10 on the basis of the sound signal, so that the cover panel 2 vibrates on the basis of the sound signal. As a result, a reception sound is transmitted from the cover panel 2 to the user. The volume of the reception sound is set to a degree such that the user can appropriately hear the sound when moving the cover panel 2 close to an ear.

Although the illustration of FIG. 2 includes the piezoelectric vibrating element 190 for transmitting the reception sound to the user, a dynamic speaker that converts an electrical sound signal from the controller 10 into a sound to output to the sound, for example, may be used instead of the piezoelectric vibrating element 190. For the dynamic speaker, the cover panel 2 or the case 3 has a receiver hole. The sound output from the dynamic speaker is output to the outside through the receiver hole located in the cover panel 2 or the case 3. The volume of the sound output through the receiver hole is lower than the volume of the sound output from the speaker 180.

The LED display 40 has the light-emitting element described above, and the controller 10 controls the light emitted from the light-emitting element. The front imaging unit 160 and the back imaging unit 170 can capture still images and moving images. The back imaging unit 170 is located in the back of the electronic device 1.

The battery 60 functions as a power supply for the action of the electronic device 1. The battery 60 supplies direct current to each unit that needs power (each unit illustrated in FIG. 2) in the electronic device 1.

The charging unit 80 receives power from an external charger, and the charging unit 80 can charge the battery 60 by supplying the received power. More specifically, the charging unit 80 includes a noncontact charging unit 82 and a charging connector (connecting unit) 84. As described below, the noncontact charging unit 82 and the charging connector 84 can respectively receive power from a noncontact charger and a contact charger, and can each charge the battery 60. The controller 10 selects one of the noncontact charging unit 82 and the charging connector 84, and the selected one charges the battery 60.

The charge detector 70 can detect whether or not the charging unit 80 is receiving power from the charger. More specifically, the charge detector 70 detects whether or not the noncontact charging unit 82 is receiving power from the noncontact charger and whether or not the charging connector 84 is receiving power from the contact charger. The detection result is input to the controller 10.

The controller 10 selects one of the noncontact charging unit 82 and the charging connector 84 according to the detection result of the charge detector 70, and the selected one can charge the battery 60.

Hereinafter, charging the battery 60 with the noncontact charging unit 82 is described with reference to FIGS. 3 to 5. Charging the battery 60 with the charging connector 84 is described with reference to FIG. 6. A specific example of an internal configuration of the charging unit 80 and the charge detector 70 is described with reference to FIG. 7.

Figure 3:
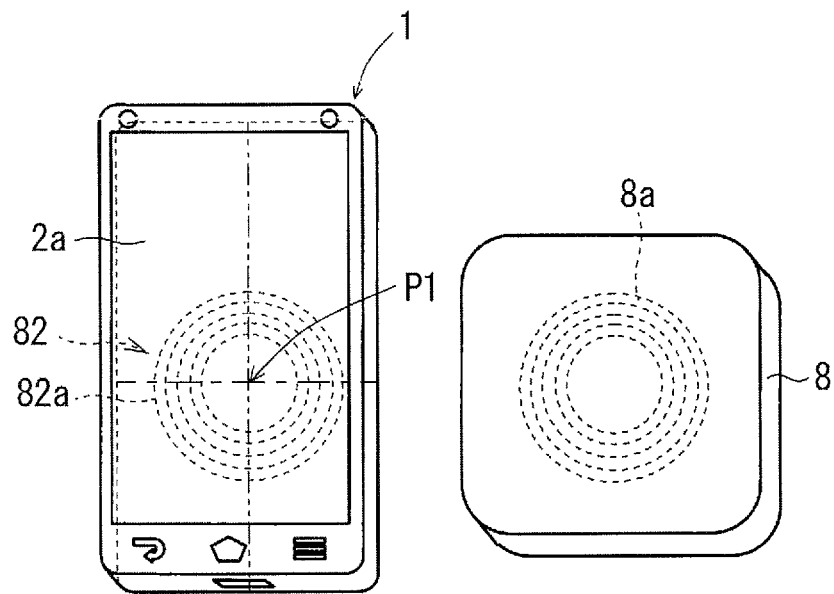
FIG. 3 illustrates a view for describing noncontact charging.

FIG. 3 illustrates a perspective view showing one example of the electronic device 1 and a noncontact charger 8. The noncontact charging unit 82 includes a charging coil 82a. The charging coil 82a has a conductor wire winding around a predetermined winding axis. The winding axis is positioned substantially orthogonal to the display region 2a.

The noncontact charger 8 has a substantially plate shape, for example, and includes a charger coil 8a. The charger coil 8a has a conductor wire winding around a predetermined winding axis. The winding axis is positioned substantially orthogonal to a main surface of the noncontact charger 8. The noncontact charger 8 is connected to a power supply, which is not shown, and the power supply can pass current (for example, alternating current) through the charger coil 8a. Consequently, the charger coil 8a generates a magnetic field (for example, an alternating field).

The user places the electronic device 1 on the main surface of the noncontact charger 8 such that the charging coil 82a faces the charger coil 8a. FIG. 4 schematically illustrates one example of cross sections of the electronic device 1 and the noncontact charger 8 when the electronic device 1 is placed on the main surface of the noncontact charger 8. In this state, a magnetic flux generated in the charger coil 8a is interlinked with the charging coil 82a. Consequently, induced electromotive force is generated in the charging coil 82a. In other words, the charging coil 82a generates the induced electromotive force in response to the magnetic field from the charger coil 8a. The induced electromotive force is alternating voltage. As described below, the noncontact charging unit 82 rectifies the induced electromotive force to charge the battery 60.

As described above, the noncontact charging unit 82 receives power through magnetic connection with the noncontact charger 8 to charge the battery 60. In other words, this way of charging does not need electrical connection between the electronic device 1 and the noncontact charger 8. For this reason, such a charging method is called noncontact charging or wireless charging. Alternatively, the charging method is also called inductive charging because charging is performed through electromagnetic induction.

To improve the efficiency (transmission efficiency) of power received by the charging coil 82a from the charger coil 8a, the noncontact charging unit 82 may include a magnetic sheet (not shown). The term "transmission efficiency" here represents a ratio of power of the charging coil 82a to power of the charger coil 8a. The magnetic sheet is made of a material having magnetic permeability higher than that of air. The charging coil 82a is located on one surface of the magnetic sheet such that the winding axis thereof is positioned substantially orthogonal to the magnetic sheet. The magnetic sheet has the high magnetic permeability, so that an amount of magnetic flux can increase. Further, the induced electromotive force in the charging coil 82a can increase. In other words, the power of the charger coil 8a needed for the charging coil 82a to generate the necessary voltage can be reduced. The magnetic sheet can suppress a leakage of magnetic flux, which passes through the charging coil 82a, to the outside.

Figure 4:
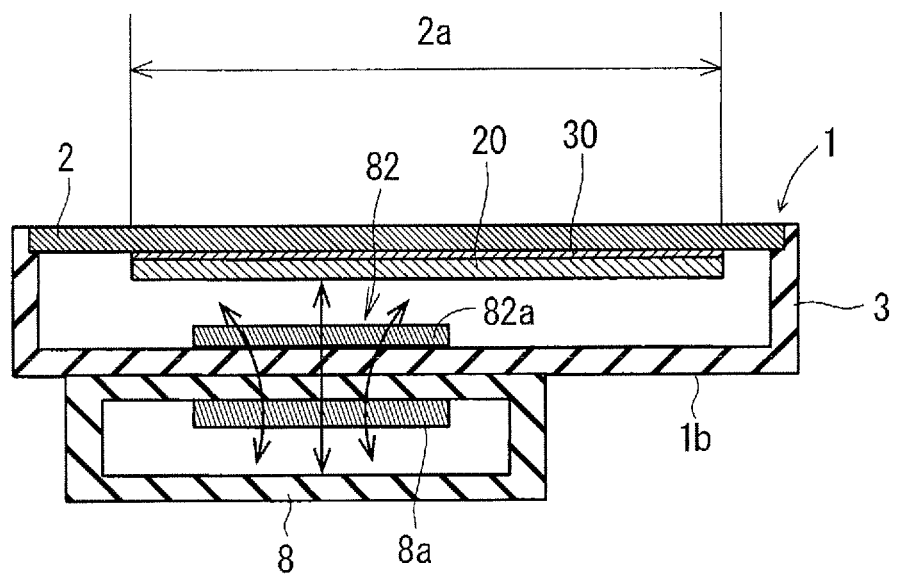
FIG. 4 illustrates a cross-sectional view schematically showing one example of the electronic device and a noncontact charger.

As illustrated in FIG. 4, the electronic device 1 is placed on the noncontact charger 8 such that a back surface 1b of the electronic device 1 faces the noncontact charger 8. Thus, the charging coil 82a is bonded to a portion of the back surface 1b of the case 3 as illustrated in FIG. 4. Consequently, the charging coil 82a can be brought close to the charger coil 8a. Reducing the distance between the charging coil 82a and the charger coil 8a in this manner can increase the amount of magnetic flux interlinked efficiently with the charging coil 82a. Therefore, the induced electromotive force in the charging coil 82a can increase in magnitude, and thus the transmission efficiency can be improved.

Figure 5:
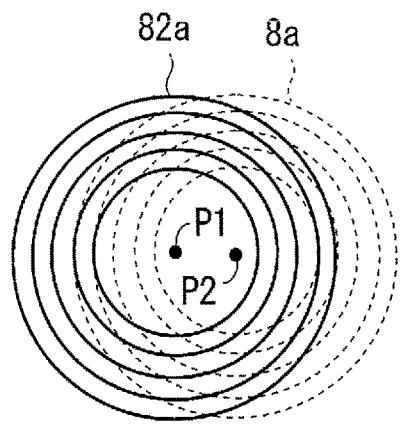
FIG. 5 illustrates a view for describing a misalignment between a charging coil and a charger coil.

When the center P1 of the charging coil 82a and the center P2 of the charger coil 8a are misaligned in plan view as illustrated in FIG. 5, the amount of magnetic flux interlinked efficiently with the charging coil 82a is reduced according to the amount (distance) of misalignment. In other words, the longer distance further reduces the induced electromotive force generated in the charging coil 82a. This reduces the transmission efficiency. Thus, the distance between the center P1 of the charging coil 82a and the center P2 of the charger coil 8a is preferably short in plan view.

Embodiments of the present disclosure provide a display technology that contributes to the reduction of the distance between the center P1 of the charging coil 82a and the center P2 of the charger coil 8a, as described below. As a precondition, the charging coil 82a is placed such that the center thereof (winding axis) is located inside the outline of the display region 2a in plan view (see FIG. 3). In other words, the display region 2a includes a position that coincides with the center of the charging coil 82a in plan view. The significance of this is clarified by description below. In addition, an intersection point of phantom lines (dashed double-dotted lines) orthogonal to each other indicates the center P1 of the charging coil 82a in FIG. 3.

Figure 6:
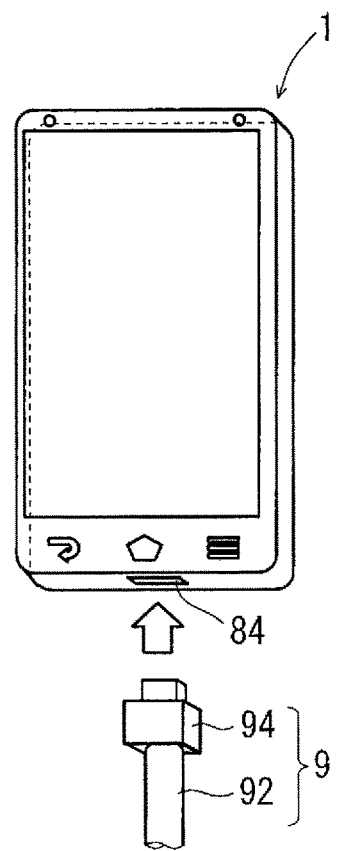
FIG. 6 illustrates a view for describing charging with a charging connector.

FIG. 6 illustrates a view for describing a method for charging a battery with a charging connector. The electronic device 1 has the charging connector 84 in a side portion (such as a lower side portion) of the electronic device, for example. A contact charger 9 is electrically connected to the charging connector 84. The contact charger 9 is removably attached to the charging connector 84. The contact charger 9 includes, for example, an electric wire 92 and a terminal 94 located at one end of the electric wire. The terminal 94 is electrically connected to the charging connector 84. The contact charger 9 includes an AC adaptor (not shown), for example. The AC adaptor can rectify alternating voltage from alternating-current power supply, for example. The rectified direct-current voltage is input to the charging connector 84 through the electric wire 92 and the terminal 94. The voltage input to the charging connector 84 is applied to the battery 60, to thereby charge the battery 60.

Figure 7:
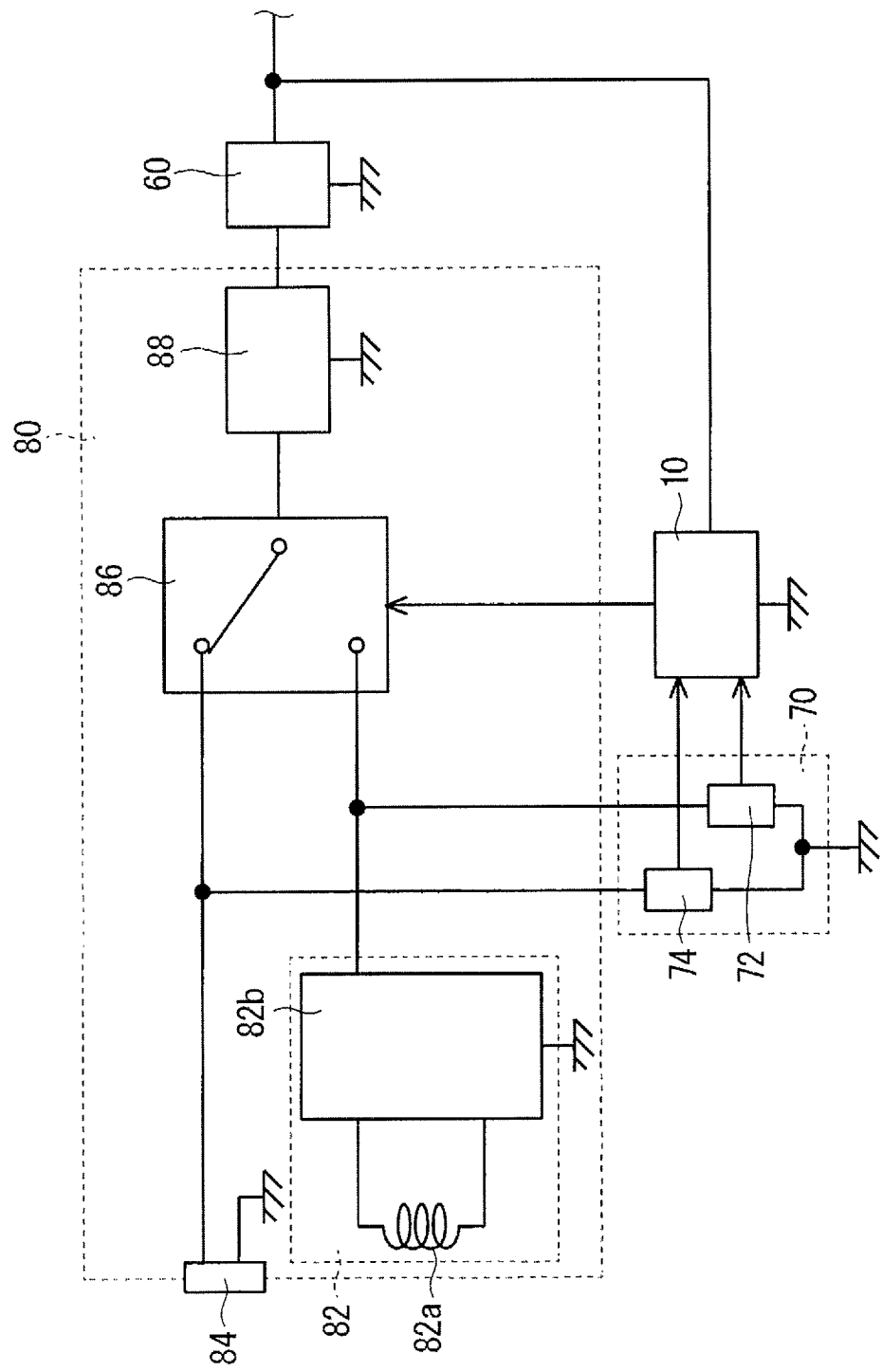
FIG. 7 illustrates a block diagram schematically showing one example of an internal configuration of a charging unit and a charge detector.

FIG. 7 illustrates a block diagram showing one example of a specific internal configuration of the charging unit 80 and the charge detector 70. The charging unit 80 includes, for example, the charging connector 84, the noncontact charging unit 82, a selection unit 86, and a voltage adjuster 88. The noncontact charging unit 82 includes the charging coil 82a and a rectifier 82b. The charging coil 82a generates the induced electromotive force in response to the magnetic field from the noncontact charger 8, as described above. The induced electromotive force (alternating voltage) from the charging coil 82a is input to the rectifier 82b. The rectifier 82b can rectify the induced electromotive force and output the rectified direct-current voltage.

The selection unit 86 can select one of the voltage from the charging connector 84 and the induced electromotive force from the charging coil 82a in response to control by the controller 10, and the battery 60 can be charged with the selected one. For example, the selection unit 86 is a switch. The selection unit 86 can select one of the voltage of the charging connector 84 and the output voltage of the noncontact charging unit 82 and input the selected one to the voltage adjuster 88.

The voltage adjuster 88 can adjust (step down or boost) the input direct-current voltage to an appropriate value and apply the adjusted direct-current voltage to the battery 60. Consequently, the battery 60 becomes charged. The voltage adjuster 88 is not needed if the voltage adjustment is unnecessary.

The charge detector 70 includes a voltage detector 72 and a voltage detector 74, for example. The voltage detector 72 can detect the output voltage of the noncontact charging unit 82 and output the detection result to the controller 10. The voltage detector 74 can detect the voltage of the charging connector 84 and output the detection result to the controller 10. When the output voltage of the noncontact charging unit 82 is greater than a reference value, it can be judged that the noncontact charging unit 82 is receiving power from the noncontact charger 8. Similarly, when the voltage of the charging connector 84 is greater than a reference value, it can be judged that the charging connector 84 is receiving power from the contact charger 9.

The controller 10 can judge whether or not the output voltage of each of the noncontact charging unit 82 and the charging connector 84 is greater than the reference value, and the controller 10 can control the selection unit 86 according to the detection result. Specifically, when the voltage of the charging connector 84 is greater than the reference value and the output voltage of the noncontact charging unit 82 is smaller than the reference value, the selection unit 86 is controlled by the controller 10 to input the voltage of the charging connector 84 to the voltage adjuster 88. In other words, the noncontact charger 8 is not used and the voltage from the contact charger 9 is input to the charging connector 84 in this case, so that the battery 60 is charged with the voltage of the charging connector 84.

On the other hand, when the voltage of the charging connector 84 is smaller than the reference value and the output voltage of the noncontact charging unit 82 is greater than the reference value, the selection unit 86 is controlled by the controller 10 to input the output voltage of the noncontact charging unit 82 to the voltage adjuster 88. In other words, the contact charger 9 is not used and the electronic device 1 is placed on the noncontact charger 8 in this case, so that the battery 60 is charged with the induced electromotive force in the charging coil 82a.

When the voltage of the charging connector 84 and the output voltage of the noncontact charging unit 82 are both greater than the reference values, the selection unit 86 is controlled by the controller 10 to input the voltage of the charging connector 84, for example, to the voltage adjuster

88. In other words, when the contact charger 9 and the noncontact charger 8 are both used, the contact charger 9 is prioritized, for example.

<Display Region 2*a*>

Figure 8:
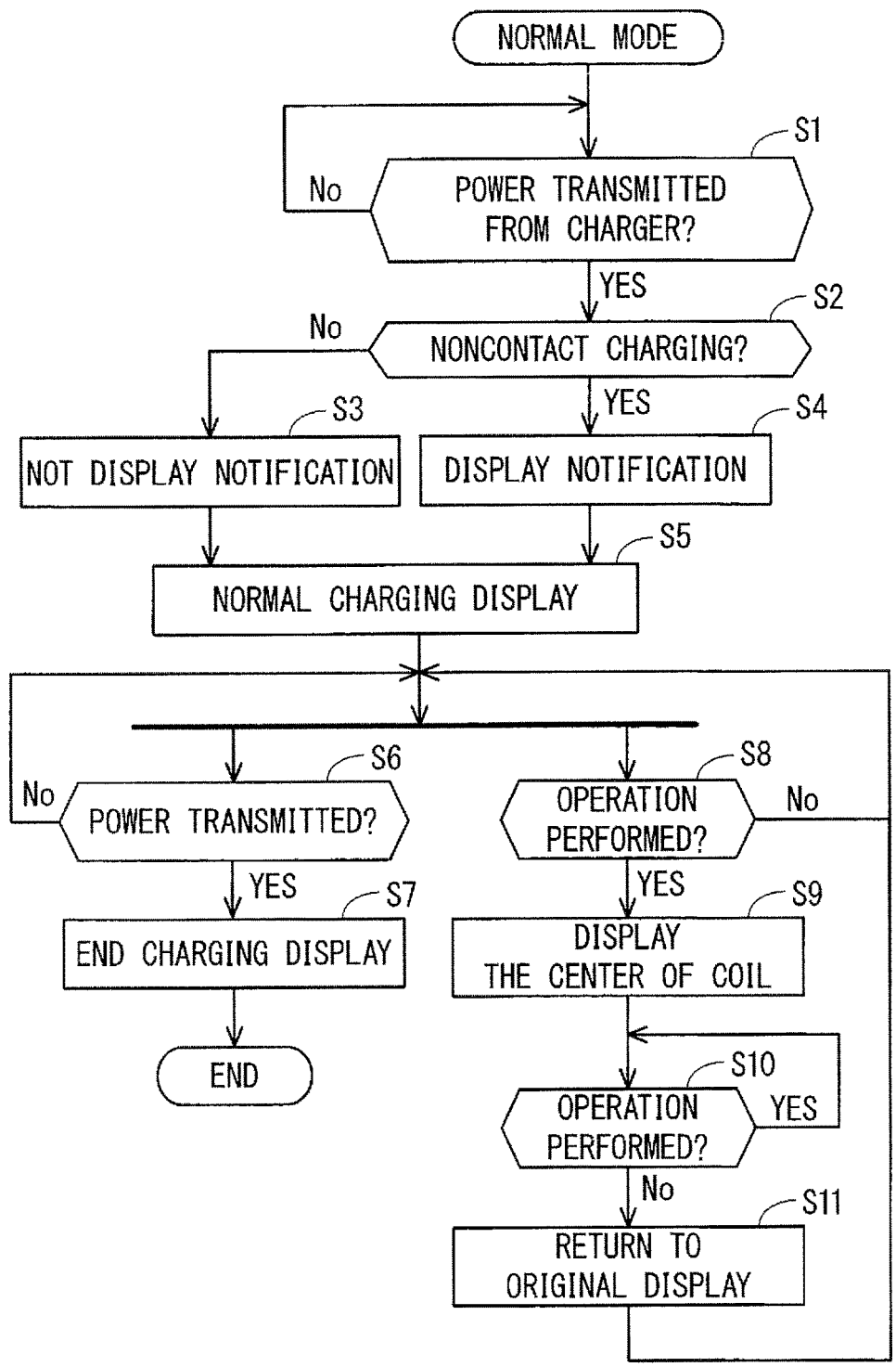
FIG. 8 illustrates a flowchart showing one example of actions of a controller.

The controller 10 controls a display of the display 20 (display region 2*a*) on the basis of the detection result of the charge detector 70. FIG. 8 illustrates a flowchart showing one example of actions of the controller 10. The actions are performed while the electronic device 1 is activated (or while each unit supplied with direct-current power supply is activated, which is also referred to as a normal mode).

First, the controller 10 judges whether or not power is transmitted from the charger in Step S1. This is judged by using the detection result of the charge detector 70. For example, when at least one of the voltage detector 72 and the voltage detector 74 detects the voltage exceeding the reference value, the controller 10 judges that the power is transmitted from the charger. A negative judgment in Step S1 causes Step S1 to be performed again.

Figure 9:
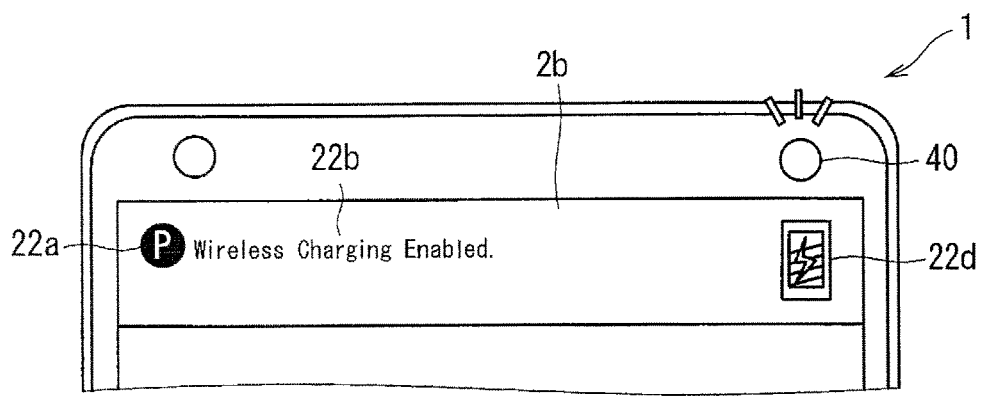
FIG. 9 illustrates a view schematically showing one example of a display in a pictographic display region.

After a positive judgment made in Step S1, the controller 10 judges whether or not noncontact charging is performed in Step S2. This is also judged by using the detection result of the charge detector 70. For example, when the voltage detector 72 detects the voltage that exceeds the reference value and the voltage detector 74 detects the voltage that falls short of the reference value, the controller 10 judges that noncontact charging is performed. After the positive judgment made in Step S2, the controller 10 causes only part (for example, the pictographic display region 2*b*) of the display region 2*a* to display that noncontact charging is performed. For example, as illustrated in FIG. 9, a FIG. 22*a* and letters 22*b* indicating that noncontact charging is performed are displayed. As illustrated in FIG. 9, the FIG. 22*a* is a black circle with a solid-white "P" therein, and the letters 22*b* are "Wireless Charging Enabled."

The controller 10 may maintain the display of the FIG. 22*a* and end the display of the letters 22*b* after a fixed period of time has elapsed. The lapse of the fixed period of time can be measured with a timer circuit. The end of the display of the letters 22*b* allows the region in which the letters 22*b* have been displayed to be used for the other notifications. Furthermore, a display area of the letters 22*b* is greater than a display area of the FIG. 22*a*, allowing for a greater region to be used for the other notifications than a region when the display of the FIG. 22*a* is ended.

In Step S5 subsequent to Step S4, the controller 10 displays that charging is performed without identifying a charging method. For example, as illustrated in FIG. 9, the controller 10 controls the LED display 40 to cause the light-emitting element to emit light, and also changes a FIG. 22*c* indicating remaining battery life in the pictographic display region 2*b* to a FIG. 22*d* indicating that charging is performed.

On the other hand, when the negative judgment is made in Step S2, the controller 10 performs Step S5 without displaying that noncontact charging is performed in Step S3. In addition, the controller 10 does not need to take substantial actions in Step S3, thereby eliminating the need for Step S3.

The action of Step S5 is performed regardless of the judgment result in Step S2, so that the LED display 40 emits the light and the FIG. 22*d* is displayed regardless of whether charging is performed with the voltage of the charging connector 84 or charging is performed with the induced electromotive force in the charging coil 82*a*.

After Step S5, the actions of Steps S6, S7 are performed concurrently with the actions of Steps S8 to S11. The concurrent actions are performed in time division, for example. Alternatively, the actions may be performed in the same period if the controller 10 can perform the two actions in the same period.

In Step S6, the controller 10 judges whether or not power is transmitted from the charger. This is judged by the detection result of the charge detector 70. For example, when both of the voltage detectors 72, 74 detect the voltage that falls short of the reference values, it is judged that the power stops to be transmitted from the charger. When the positive judgment is made in Step S6, it is judged that charging is still performed and Step S6 is performed again. When the negative judgment is made in Step S6, it is judged that charging is completed and Step S7 is performed. In Step S7, the controller 10 stops the light emission of the LED display 40, ends the display of the FIG. 22*a* (and the letters 22*b* if necessary) in the pictographic display region 2*b*, and changes the FIG. 22*d* to the FIG. 22*c*. Then, the processing is finished. In other words, when charging is completed, the display for charging is also ended.

Next, the actions of Steps S8 to S11 are described. In addition, the actions of Steps S8 to S11 are predicated on noncontact charging, so that Steps S8 to S11 may be performed only during noncontact charging.

In Step S8, the controller 10 judges whether or not an operation that triggers execution of Step S9 is performed. The presence or absence of the operation is judged by the presence or absence of an operation on the operation key 50, the operation key 52, or the touch panel 30. The other operations described below are the same, so that repetitive descriptions are omitted.

Herein, it is judged that the operation that triggers the execution of Step S9 is performed when a plurality of operations described next are performed. For example, the controller 10 displays a notification window in the display region 2*a* in response to a first operation. The notification window displays details of notifications displayed in the pictographic display region 2*b*. The first operation includes an operation with an operator sliding from the outside of an upper region to the inside of the display region 2*a*. The touch panel 30 detects the first operation.

Figure 10:
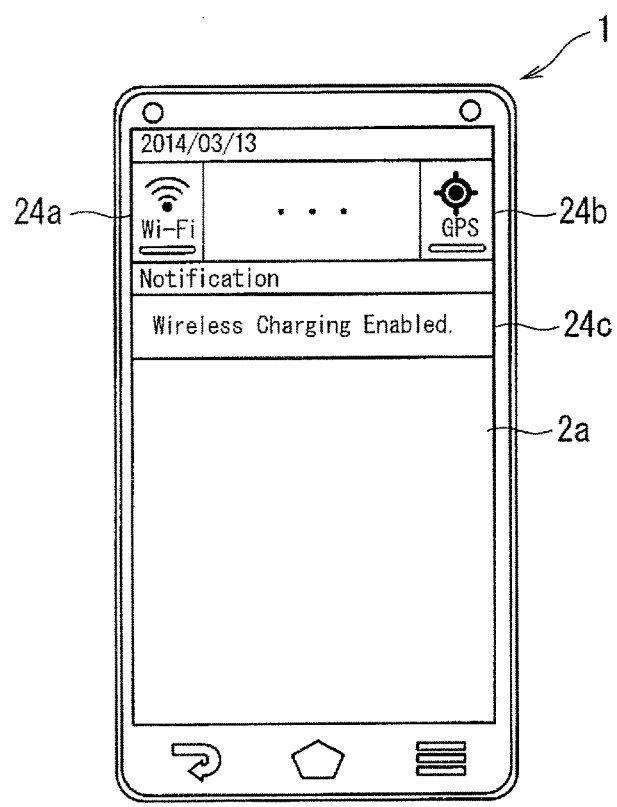
FIG. 10 illustrates a view schematically showing one example of a notification window.

FIG. 10 illustrates a view schematically showing one example of the notification window. The notification window displays various notifications to the user. For example, a frame 24*a* including a figure and letters that indicate whether or not the function of connecting the device to a wireless LAN is turned on and a frame 24*b* including a figure and letters that indicate whether or not the GPS function is turned on are displayed in FIG. 10. A frame 24*c* indicating that noncontact charging is performed is also displayed below the frames 24*a*, 24*b*. When the touch panel 30 detects a second operation on the frame 24*c* by the user, the positive judgment is made in Step S8. The second operation may include an operation (a so-called "tap") with the operator that is closely in contact with or that contacts part of the display region 2*a* and then moves off the display region 2*a*.

The plurality of operations may not necessarily be performed, and any operation may be performed one time. For example, when the operation (such as the tap) on the FIG. 22*a* or the letters 22*b* in FIG. 9 is detected, the positive judgment may be made in Step S8.

The negative judgment in Step S8 causes Step S8 to be performed again. When the positive judgment is made in Step S8, the controller 10 displays a screen (hereinafter referred to as a charging screen) for indicating a central position of the charging coil 82*a* in Step S9. The charging screen is displayed in the entire display region 2a (or the entire main region), for example. For example, in a case where a display screen is displayed in the display region 2a by an application program immediately before Step S9, it is sufficient that the charging screen is displayed in the display region 2a after the application is properly suspended.

Figure 11:
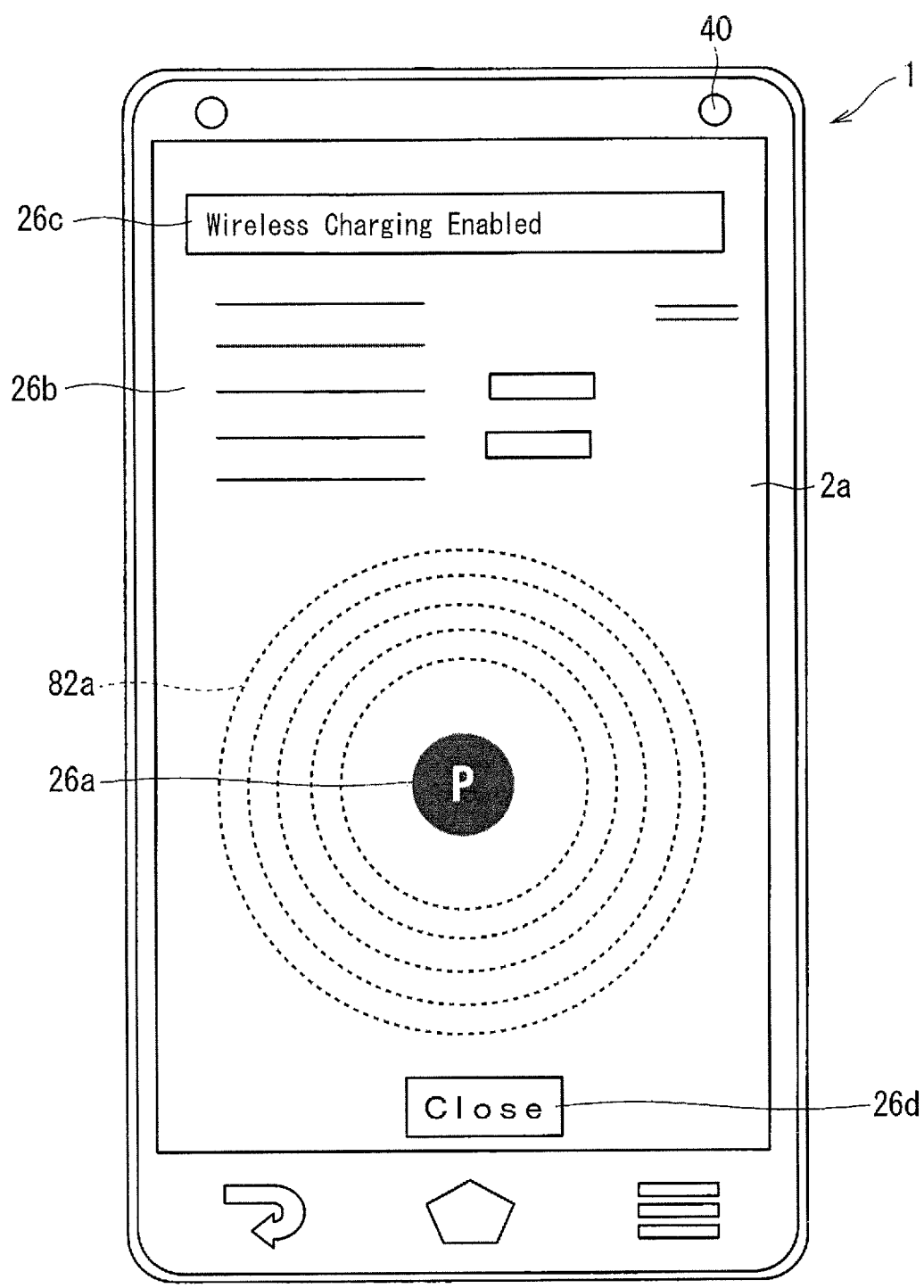
FIG. 11 illustrates a view schematically showing one example of a charging screen.

FIG. 11 schematically illustrates one example of the charging screen. The charging screen displays information (a FIG. 26a in FIG. 11) indicating the center of the charging coil 82a. In one embodiment as described above, the center P1 of the charging coil 82a is located inside the outline of the display region 2a. In other words, the position that coincides with the center P1 of the charging coil 82a is located in the display region 2a in plan view. Thus, the controller 10 displays the FIG. 26a indicating the center P1 in the position. The FIG. 26a in FIG. 11 is the same as the FIG. 22a, but they may be different from each other. Such a display allows the user to recognize the central position of the charging coil 82a. Thus, the user can easily adjust the position of the electronic device 1 to align the center P1 of the charging coil 82a with the center P2 of the charger coil 8a.

The controller 10 may display information (a sentence 26b in FIG. 11) that encourages the user to align the center P1 of the charging coil 82a with the center P2 of the charger coil 8a in the charging screen. This allows the user to clearly recognize the need to align the position of the center P1 of the charging coil 82a with the position of the center P2 of the charger coil 8a.

The controller 10 may display information (letters 26c in FIG. 11) indicating that noncontact charging is performed in the charging screen. The letters 26c are the same as the letters 22b (FIG. 9), for example. For example, "During Noncontact Charging" or "Wireless Charging" may be displayed as the letters 22b, 26c. This allows the user to clearly recognize that noncontact charging is performed also in the charging screen. A figure indicating that noncontact charging is performed may be displayed with or instead of the letters 26c.

Figure 12:
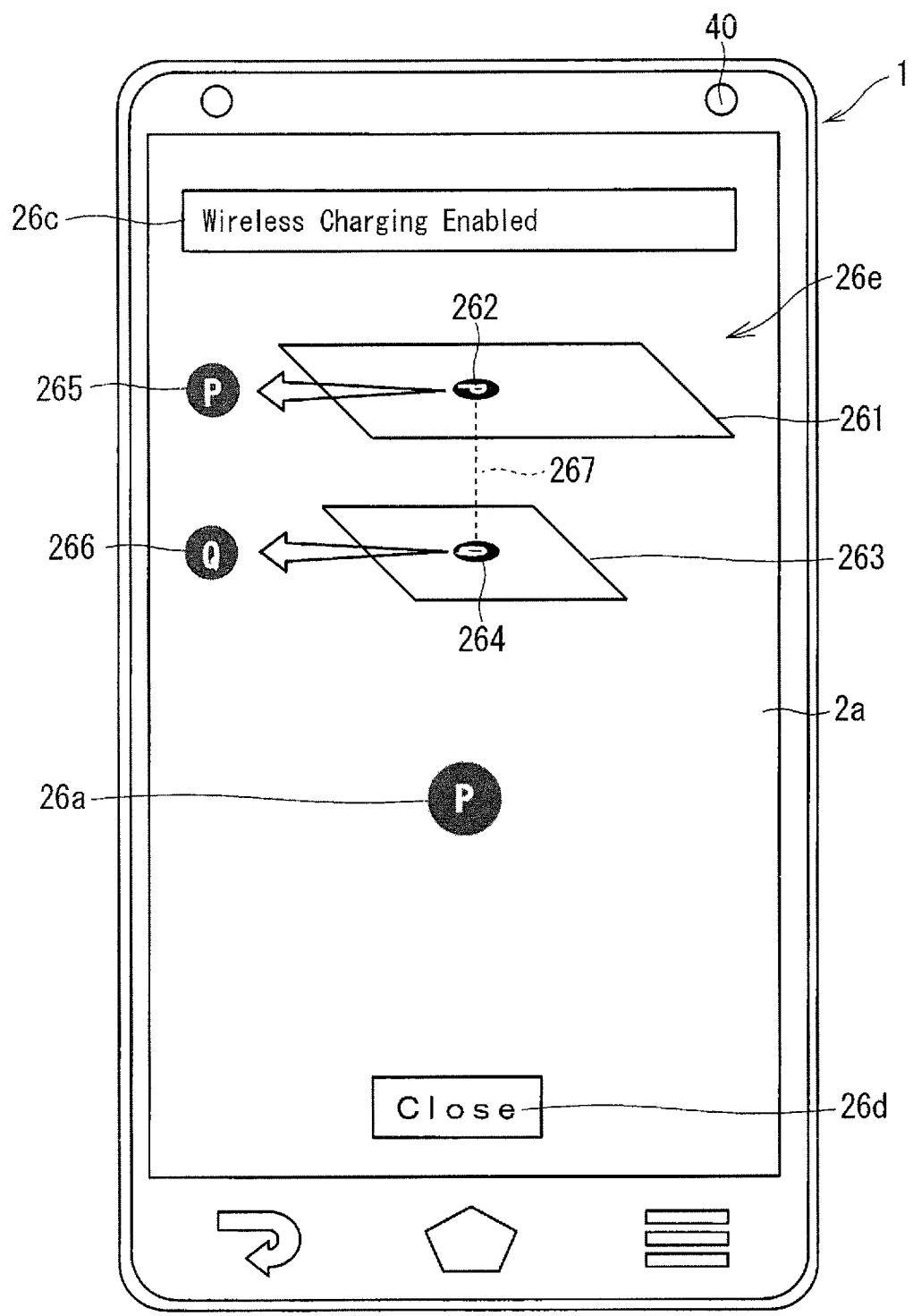
FIG. 12 illustrates a view schematically showing one example of the charging screen.

As illustrated in FIG. 11, the sentence 26b encourages the user to align the center P1 of the charging coil 82a with the center P2 of the charger coil 8a. However, a FIG. 26e may be displayed with or instead of the sentence 26b, as illustrated in FIG. 12. The FIG. 26e encourages the user to align the center P1 of the charging coil 82a with the center P2 of the charger coil 8a.

As illustrated in FIG. 12, a plane 261 schematically illustrating a perspective view of the electronic device 1, a figure 262 illustrating a perspective view of the FIG. 26a inside the plane 261, a plane 263 schematically illustrating a perspective view of the noncontact charger 8, and a figure 264 illustrated in perspective view inside the plane 263 are displayed in the FIG. 26e. The figures 262, 264 in perspective view are hard to see, and thus figures 265, 266, which are the figures 262, 264 in plan view, are also displayed. As illustrated in FIG. 12, an arrow whose starting point is toward the figure 262 and endpoint is toward the figure 265 is also displayed to clarify the correspondence between the figures 262, 265. A similar arrow is also displayed for the figures 264, 266. The figure 266 indicates the position of the center P2 of the charger coil 8a in the noncontact charger 8, and the figure 266 is preferably located also on the main surface of the noncontact charger 8 (more specifically, the position indicating the center of the charger coil 8a). This allows the user to understand that the figure 266 (264) indicates the center of the charger coil 8a. A broken line 267 indicating that the positions of the figures 262, 264 in perspective view coincide with each other is also displayed in the FIG. 26e.

The FIG. 26e allows the user to intuitively understand the need to align the position (namely, the center P1) indicating the FIG. 26a in the electronic device 1 with the position (namely, the center P2) indicating the figure 266 in the noncontact charger 8.

FIG. 11 illustrates a plurality of concentric circles schematically showing the charging coil 82a by broken lines. The concentric circles may be displayed in the charging screen. This allows the user to intuitively understand that the FIG. 26a indicates the center of the charging coil 82a.

Letters indicating the center P1 may be displayed instead of the FIG. 26a indicating the center P1 of the charging coil 82a. In other words, it is sufficient that a mark indicating the center P1 of the charging coil 82a is displayed.

In Step S10 subsequent to Step S9, it is judged whether or not a third operation that triggers the end of the display of the charging screen is performed. For example, the charging screen displays a "Close" button 26d. The third operation may include an operation (such as the tap) on the "Close" button 26d. The negative judgment in Step S10 causes Step S10 to be performed again. When the positive judgment is made in Step S10, the controller 10 ends the display of the charging screen and returns the display region 2a to the display screen prior to Step S9 in Step S11. Then, Step S8 is performed again.

In one embodiment as described above, when the user performs the operation during noncontact charging, the charging screen including the FIG. 26a (or letters) indicating the center of the charging coil 82a is displayed. In other words, in the absence of the operation by the user during noncontact charging, the charging screen is not displayed. Thus, the display screen immediately before charging is maintained. That is to say, the application program executed immediately before charging continues to be executed.

Thus, while the user executes an application program in the electronic device 1, noncontact charging performed due to concern about an insufficient amount of charge does not hamper the execution of the application. This can enhance the convenience.

Moreover, when the user performs a predetermined operation during noncontact charging as described above, the central position of the charging coil 82a is displayed according to the operation. This allows the user to recognize the position of the center P1 of the charging coil 82a. Thus, the center P1 is easily aligned with the center P2 of the charger coil 8a.

In one example described above, the actions of Steps S6, S7 are performed concurrently with the actions of Steps S8 to S11. Thus, the negative judgment is made in Step S6 when the power stops to be transmitted from the charger during the display of the charging screen in Step S9, and thus the display of charging screen is ended in Step S7. This allows the display region 2a to immediately return to the original display.

The actions of Steps S8 to S11 may be performed while noncontact charging is not performed. In this case, the center of the charging coil 82a is displayed by a predetermined operation by the user even if noncontact charging is not performed. Therefore, the user can recognize the position of the center of the charging coil 82a before noncontact charging. Thus, the user can easily place the electronic device 1 on the noncontact charger 8 while aligning the central position of the charging coil 82a with the central position of the charger coil 8a. For example, when charging with the charging connector 84 is switched to noncontact charging, the position of the center of the charging coil 82*a* can be recognized in advance. Thus, the electronic device 1 is easily placed while the central position of the charging coil 82*a* is aligned with the central position of the charger coil 8*a*.

<Noncontact Charging and Charging with Charging Connector>

When power is transmitted from both of the noncontact charger 8 and the contact charger 9, the controller 10 gives high priority to the contact charger 9 and uses it, for example. More specifically, the selection unit 86 is controlled by the controller 10 to input the voltage of the charging connector 84 to the voltage adjuster 88.

In view of the action described above, when the controller 10 judges that the power is transmitted from the contact charger 9, that is to say, the voltage is input to the charging connector 84, during the display of the charging screen in Step S9, the controller 10 may end the display of the charging screen and return the display region 2*a* to the original display screen. This allows the display according to the actual charging to be performed immediately.

For the more specific action, the controller 10 judges whether or not the power is transmitted from the contact charger 9 concurrently with the actions of Steps S8 to S10 performed during noncontact charging, for example. This is judged by the detection result of the charge detector 70. When it is judged that the power is transmitted from the contact charger 9, the controller 10 stops the actions of Steps S8 to S10. In the stage of the execution of Step S8, for example, the controller 10 does not perform the subsequent action of Step S8. For example, in the execution of Steps S9 and S10, the controller 10 ends the display of the charging screen and returns the display region 2*a* to the original display screen, and then the controller 10 does not perform the actions of Steps S8 to S11.

On the other hand, when the contact charger 9 is removed again and only noncontact charging is performed, the actions of Steps S8 to S11 may also be performed again.

<Display of Transmission Efficiency>

An electronic device 1 illustrated in FIG. 13 further includes a transmission efficiency detector 90 in addition to the electronic device 1 in FIG. 2. The transmission efficiency detector 90 can detect transmission efficiency depending on the amount of misalignment between the center P1 of the charging coil 82*a* and the center P2 of the charger coil 8*a*. For example, the transmission efficiency increases with increase in output voltage of the noncontact charging unit 82, so that the voltage detector 72 can be used as the transmission efficiency detector 90. In this case, the transmission efficiency detector 90 is achieved as part of the charge detector 70. The detected transmission efficiency (for example, the output voltage) is input to the controller 10.

The controller 10 can also display information indicating the transmission efficiency in the charging screen. The charging efficiency is displayed by a numerical value or a figure. Hereinafter, specific actions are described.

First, transmission efficiency (herein output voltage, hereinafter referred to as maximum voltage) when the position of the center P1 of the charging coil 82*a* is aligned with the position of the center P2 of the charger coil 8*a* is previously stored. For example, the maximum voltage is previously stored in the storage 103.

Figure 14:
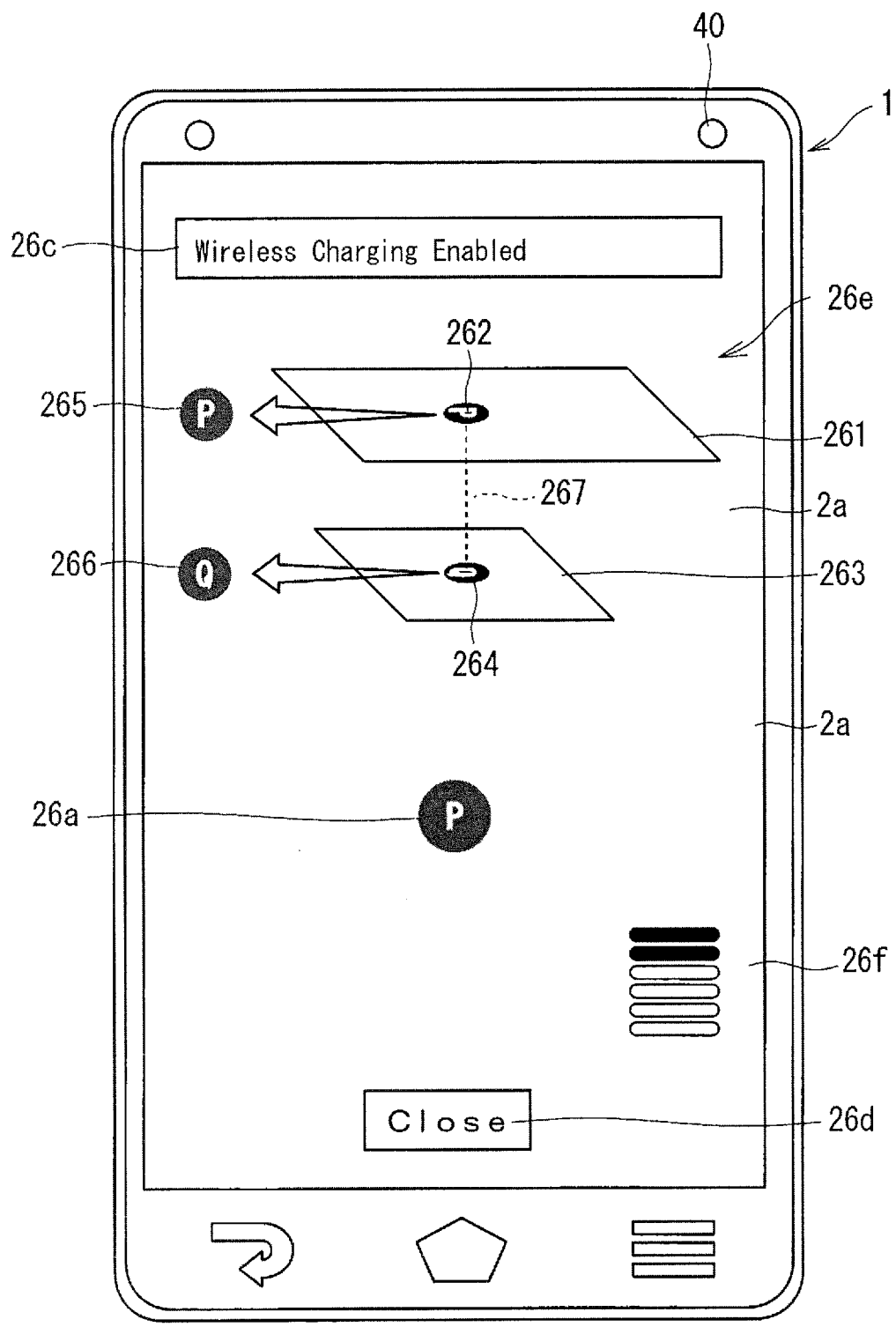
FIG. 14 illustrates a view schematically showing one example of the charging screen.

Then, in Step S9, the controller 10 also displays the transmission efficiency in the charging screen on the basis of a numerical value in which detection voltage detected by the voltage detector 72 is standardized by the maximum voltage. For example, the standardized numerical value may be displayed as it is. This allows the user to recognize the transmission efficiency, namely, the amount of misalignment between the center P1 of the charging coil 82*a* and the center P2 of the charger coil 8*a*. Alternatively, a FIG. 26*f* may be displayed as illustrated in FIG. 14. The FIG. 26*f* indicates the numerical value and has a plurality of long bars stacked on top of each other in layers, for example. The controller 10 changes the color of the more long bars from the bottom with greater transmission efficiency. The user can recognize the transmission efficiency by the number of long bars whose color is changed. The long bars whose color is changed increase with increase in transmission efficiency.

This allows the user to adjust the electronic device 1 while recognizing the transmission efficiency (the amount of misalignment between the center P1 and the center P2) and to easily align the center P1 with the center P2.

One example described above exemplifies the voltage detector 72 as the transmission efficiency detector 90. However, this is not restrictive, and the transmission efficiency detector 90 may detect amplitude (magnitude) of induced electromotive force (alternating voltage), for example. The reason is that the transmission efficiency increases with increase in amplitude. Alternatively, the transmission efficiency increases with increase in amplitude of the alternating current output from the charging coil 82*a*, so that a current detector that detects alternating current or current passing through the output side of the rectifier 82*b* may be used as the transmission efficiency detector 90. Alternatively, the transmission efficiency increases with increase in magnetic flux interlinked with the charging coil 82*a*, so that a magnetic sensor that detects the magnetic flux may be used as the transmission efficiency detector 90. The above-mentioned amount (such as current and magnetic flux) when the centers P1 and P2 coincide with each other is previously stored as specification values, and the transmission efficiency may be displayed on the basis of a numerical value in which a detected amount is standardized by the specification values.

<Sleep Mode>

When an operation has not been performed after a predetermined period of time has elapsed, the controller 10 shifts the mode of the electronic device 1 from the normal mode to a sleep mode. The normal mode may be interpreted as a state where the display 20 displays the display screen, for example. The sleep mode consumes less power than the normal mode. In the sleep mode, the controller 10 suspends the display (lighting) of the display 20, for example. If the display 20 is a liquid crystal display, backlight is turned off. Consequently, nothing displays in the display region 2*a* while the power consumed by the backlight can be avoided. In this case, the operation on the display region 2*a* is also disabled.

When an operation (for example, the press of the operation key 50 for a short period of time) that cancels the sleep mode is detected, the controller 10 shifts the mode of the electronic device 1 from the sleep mode to the normal mode. Consequently, the display of the display region 2*a* is restored, and the operation on the display region 2*a* is enabled.

Even when the operation key 50 is pressed during the sleep mode in the electronic device 1, the controller 10 may not display the charging screen. In other words, the controller 10 may prohibit the display of the charging screen in the sleep mode. This can prioritize the reduction in power consumption.

<Modifications>

In one example described above, the FIG. 22a and the letters 22b indicating that charging is performed with the noncontact charger 8 are displayed in the pictographic display region 2b in Step S4 (FIG. 8). However, when the display screen is displayed in the entire display region 2a by a predetermined application at the time of the execution of Step S4, the pictographic display region 2b is not displayed, and thus the FIG. 22a and the letters 22b may also not be displayed. It should be noted that when the application is suspended or ended and the pictographic display region 2b is displayed, the FIG. 22a and the letters 22b are also preferably displayed. This also holds true for the FIG. 22d described in Step S5.

Second Embodiment

A function of switching between a normal mode and a shutdown mode of the electronic device 1 (namely, turn on and turn off the power) is assigned to the operation key 50 of the electronic device 1. For example, when the controller 10 recognizes that the operation key 50 is pressed and held for a relatively long period of time, the electronic device 1 is switched between the normal mode and the shutdown mode. In the normal mode, the controller 10 supplies each of the units with direct-current power supply from the battery 60 to activate each of the units. In the shutdown mode, the controller 10 shuts off the supply of the direct-current power supply to each of the units (such as the wireless communication unit 110, the front imaging unit 160, the back imaging unit 170, the display 20, and the touch panel 30). In the shutdown mode, the direct-current power supply is supplied to several structural units. For example, the controller 10 is supplied with the direct-current power supply even in the shutdown mode, and the controller 10 can recognize the operation on the operation key 50. The direct-current power supply is supplied to the other necessary structural units. From the viewpoint of the display 20, the shutdown mode may be interpreted as a state where the direct-current voltage is not supplied to the display 20 or a state where an image signal indicating the display screen is not output to the display 20.

If the normal mode is interpreted as a state where the power consumption is high, the shutdown mode may be interpreted as a state where the power consumption is lower than that in the normal mode. Further, the shutdown mode is the state where the power consumption is lower than that in the sleep mode described above. For example, the number of structural units activated in the shutdown mode is lower than the number of structural units activated in the sleep mode.

In the first embodiment, the display during charging in the normal mode and the sleep mode is described. In the second embodiment, a display during charging in the shutdown mode will be described.

In the second embodiment, the charge detector 70 functions in the shutdown mode. Thus, if the charge detector 70 needs the direct-current power supply to function, the charge detector 70 is supplied with the direct-current power supply even in the shutdown mode.

Figure 15:
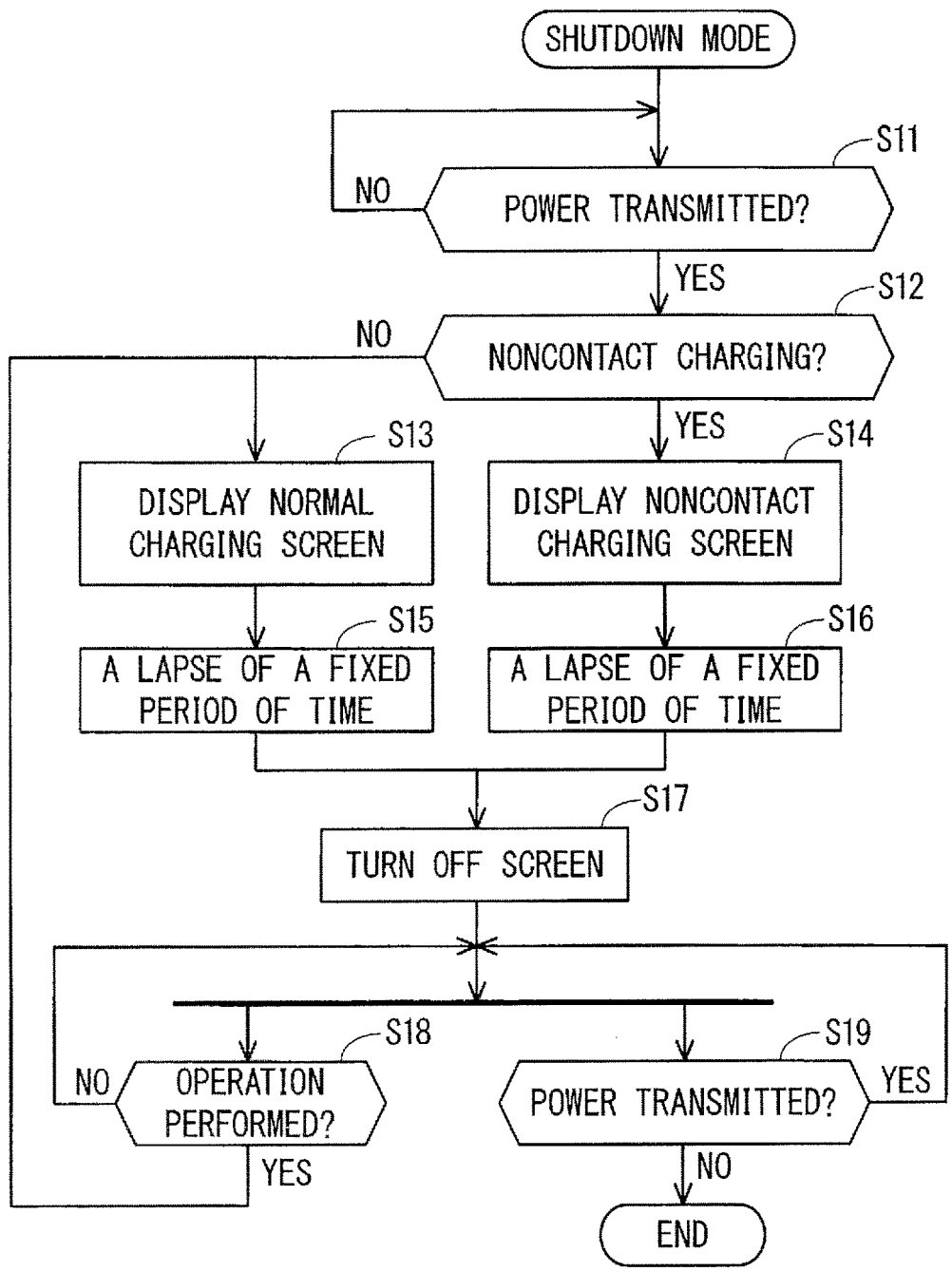
FIG. 15 illustrates a flowchart showing one example of actions of a controller.

FIG. 15 illustrates a flowchart showing one example of actions of the controller 10. Steps S11, S12 are the same as Steps S1, S2. When it is judged that charging is performed with the noncontact charger 8 in Step S12, the controller 10 displays a noncontact charging screen in Step S14. In a case where the display 20 is not activated in the shutdown mode, first, the controller 10 supplies the direct-current power supply to the display 20 and activates the display 20, and then the controller 10 displays the noncontact charging screen in the display 20. The noncontact charging screen includes information for indicating the center P1 in the position coinciding with the center P1 of the charging coil 82a in plan view. The charging screen (FIG. 11, FIG. 12, or FIG. 14) described in the first embodiment may be used as the noncontact charging screen. The various pieces of information (the figures or the letters) described in the first embodiment may be included in the noncontact charging screen. The effects are the same as those described in the first embodiment.

The position of the center P1 is also displayed in the second embodiment, allowing for the user to easily align the center P1 of the charging coil 82a with the center of the charger coil 8a.

In Step S14, the controller 10 may control the LED display 40 to cause the light-emitting element to emit light.

Next, the controller 10 detects a lapse of a fixed period of time since the execution of Step 14 in Step S16, and the controller 10 turns off the display 20 in Step S17. The lapse of the fixed period of time can be detected with a timer circuit. If the display 20 is a liquid crystal display, for example, the display 20 is turned off by turning off the backlight.

Figure 16:
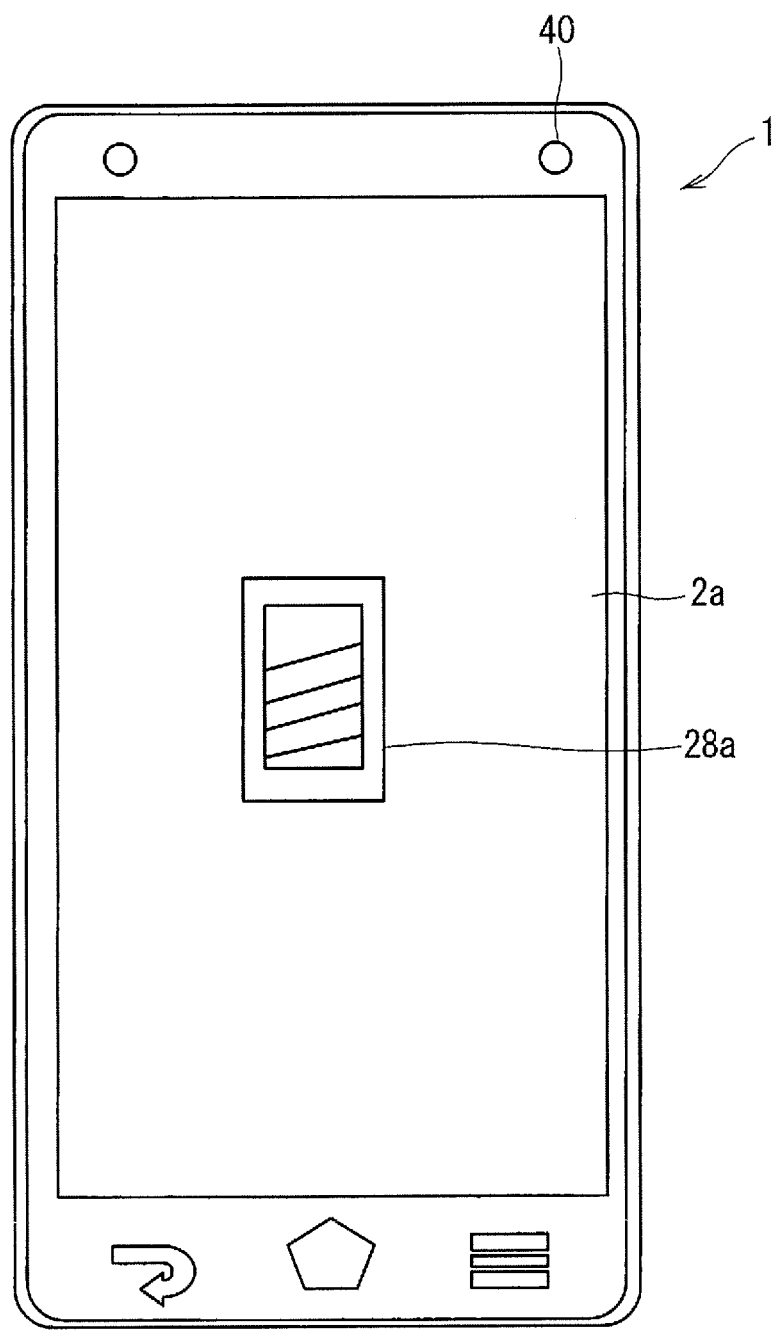
FIG. 16 illustrates a view schematically showing one example of a normal charging screen.

When the negative judgment is made in Step S12, the controller 10 displays a normal charging screen in Step S13. In the case where the display 20 is not activated in the shutdown mode, first, the controller 10 supplies the direct-current power supply to the display 20 and activates the display 20, and then the controller 10 displays the normal charging screen in the display 20. The normal charging screen includes the display simply indicating that charging is performed regardless of whether or not it is noncontact charging. FIG. 16 illustrates a view schematically showing one example of the normal charging screen. As illustrated in FIG. 16, a FIG. 28a is displayed substantially in the center of the display region 2a. The FIG. 28a is the same figure as the FIG. 22c or the FIG. 22d.

Display voltage may not be applied to pixels in a region except for the FIG. 28a. In this case, the other region is displayed in black.

The display of the normal charging screen allows the user to clearly recognize that charging is properly performed.

In Step S13, the controller 10 may control the LED display 40 to cause the light-emitting element to emit light.

Next, the controller 10 detects a lapse of a fixed period of time since the execution of Step 13 in Step S15, and the controller 10 turns off the display 20 in Step S17.

As described above, the display of the normal charging screen or the noncontact charging screen is turned off after the fixed period of time has elapsed. This allows the reduction in power consumption thereafter.

After Step S17, judgments in Steps S18 and S19 are concurrently made. In Step S18, the controller 10 judges whether or not an operation to check charging is performed. The operation to check charging may include the press of the operation key 50 for a relatively short period of time, for example. When it is judged that the operation to check charging is not performed, Step S18 is performed again. When it is judged that the operation to check charging is performed, Step S13 is performed. In other words, in the presence of the operation to check charging, the normal charging screen is displayed regardless of whether or not noncontact charging is performed.

It is assumed that the electronic device 1 is not used by the user in the shutdown mode, so that the position of the electronic device 1 is assumed to remain unchanged. Thus, in a first display for the first time, the display of the noncontact charging screen encourages the user to move the position of the electronic device 1 to the appropriate position (position where the center P1 of the charging coil 82*a* coincides with the center P2 of the charger coil 8*a*), and the normal charging screen is displayed in the subsequent display. Consequently, a judgment process corresponding to S12 can be omitted in the subsequent display, and the normal charging screen can easily be displayed.

In one example described above, the display for charging is displayed only one time for the first time, but, for example, the noncontact charging screen may be displayed in response to each of a plurality of operations to check charging, and the normal charging screen may be displayed in response to subsequent operations to check charging. More specifically, the controller 10 counts the operations to check charging, and the controller 10 may display the noncontact charging screen when the operations are less than the predetermined number of operations, for example, and may display the normal charging screen when the operations are more than the predetermined number of operations, for example.

According to the flowchart in FIG. 15, when the operation to check charging is performed during the display of the noncontact charging screen in Step S14, the normal charging screen in Step S13 is not displayed. In other words, the controller 10 disables the operation to check charging during the display of the noncontact charging screen. Thus, the display of the noncontact charging screen can be properly maintained.

When the power stops to be transmitted from the charger during the display of the normal charging screen in Step S13 or during the display of the noncontact charging screen in Step S14, the controller 10 may end the display and turn off the display 20. More specifically, the controller 10 performs an action corresponding to Step S19 concurrently with the actions of Steps S13 to S16, and the controller 10 may stop the actions of Steps S13 to S16 and perform the same action as Step S17 when the power stops to be transmitted from the charger. Then, the action of Step S11 is performed again.

When the power is transmitted from both of the noncontact charger 8 and the contact charger 9, a display may be controlled in a manner below during charging with the contact charger 9. In other words, when the power is transmitted from the contact charger 9 during the display of the noncontact charging screen in Step S14, the controller 10 ends the display of the noncontact charging screen. More specifically, the controller 10 judges whether or not the power is transmitted from the contact charger 9 concurrently with the actions of Steps S14, S16. The positive judgment stops Steps S14, S16, and the display of the noncontact charging screen is ended before the lapse of the fixed period of time. For example, the action of Step S17 is performed. Subsequently, the actions of Steps S18, S19 are concurrently performed.

The actions can quickly end the display of the noncontact charging screen. Subsequently, the normal charging screen can also be displayed in response to the operation to check charging.

As described in the first embodiment, even if the operation to check charging (operation on the operation key 50) is performed in the sleep mode, the controller 10 does not display the charging screen (including the normal charging screen). This can prioritize the reduction in power consumption.

Although one example above have described, as an example, the case in which one embodiment is applied to the mobile phone, one embodiment is also applicable to electronic devices except for mobile phones such as smart phones, for example, tablet terminals.

In the above description, the electronic device 1 is described in detail, but the above description is the exemplification in all aspects and embodiments of the present disclosure are not intended to be limited thereto. In addition, one embodiment and various modifications described above are applicable in combination as long as they are not mutually inconsistent. And, it is construed that numerous modifications which are not exemplified can be envisaged without departing from the scope of the present disclosure.

The invention claimed is:

1. An electronic device, comprising:
    a charging coil configured to generate induced electromotive force by interlinkage of a magnetic field from an external charger coil with the charging coil;
    a battery to be charged with the induced electromotive force;
    a display including a display region, a position that coincides with the center of the charging coil being located inside an outline of the display region in plan view;
    an operation unit; and
    at least one processor configured to display, in the display region, a charging screen including first information that indicates the center of the charging coil in the position when an operation is performed on the operation unit while the battery is charged with the induced electromotive force, wherein the at least one processor causes only part of the display region to display a letter and a figure indicating that charging is performed with the induced electromotive force when charging is performed with the induced electromotive force, and at least one processor maintains the display of the figure and ends the display of the letter after a lapse of a predetermined period of time.

2. The electronic device according to claim 1, wherein the charging screen includes second information that encourages a user to align the center of the charging coil with the center of the charger coil.

3. The electronic device according to claim 1, wherein the charging screen includes third information that indicates transmission efficiency being a ratio of power of the charging coil to power of the charger coil.

4. The electronic device according to claim 1, wherein the charging screen includes fourth information indicating that the battery is charged with the induced electromotive force.

5. An electronic device, comprising:
    a charging coil configured to generate induced electromotive force by interlinkage of a magnetic field from an external charger coil with the charging coil;
    a battery to be charged with the induced electromotive force;
    a display including a display region, a position that coincides with the center of the charging coil being located inside an outline of the display region in plan view;
    an operation unit;
    at least one processor configured to display, in the display region, a charging screen including first information that indicates the center of the charging coil in the position when an operation is performed on the operation unit while the battery is charged with the induced electromotive force;

a charging connector removably and electrically connected to an external contact charger and configured to receive an input of voltage from the contact charger; and a selection unit configured to select one of the voltage from the charging connector and the induced electromotive force in response to control by the at least one processor, the battery being charged with the selected one, wherein the at least one processor causes the selection unit to select the voltage from the charging connector when the voltage is input to the charging connector and the induced electromotive force is generated, and the at least one processor ends the display of the charging screen when the voltage is input to the charging connector during the display of the charging screen in the display region.

6. An electronic device, comprising:

a charging coil configured to generate induced electromotive force by interlinkage of a magnetic field from an external charger coil with the charging coil;

a battery to be charged with the induced electromotive force;

a display including a display region, a position that coincides with the center of the charging coil being located inside an outline of the display region in plan view;

an operation unit; and at least one processor configured to display, in the display region, a charging screen including first information that indicates the center of the charging coil in the position when an operation is performed on the operation unit while the battery is charged with the induced electromotive force, wherein the at least one processor displays the charging screen when the battery is charged with the induced electromotive force and an operation is performed on the operation unit in a first mode that performs a display in the display region, and displays the charging screen when the battery is charged with the induced electromotive force in a second mode in which power consumption is lower than that in the first mode.

7. The electronic device according to claim 6, wherein the at least one processor does not display the charging screen even when the operation is performed in a third mode in which power consumption is higher than that in the second mode and is lower than that in the first mode.

8. A display method in an electronic device that comprises: a charging coil configured to generate induced electromotive force by interlinkage of a magnetic field from an external charger coil with the charging coil; a battery to be charged with the induced electromotive force; a display including a display region, a position that coincides with the center of the charging coil being located inside an outline of the display region in plan view; and an operation unit, the display method comprising:

displaying, in the display region, a charging screen including a letter or a figure that indicates the center of the charging coil in the position when an operation is performed on the operation unit while the battery is charged with the induced electromotive force; and causing only part of the display region to display a letter and a figure indicating that charging is performed with the induced electromotive force when charging is performed with the induced electromotive force, and at least one processor maintains the display of the figure and ends the display of the letter after a lapse of a predetermined period of time.

9. A non-transitory computer readable recording medium that stores a control program for controlling an electronic device, the electronic device including a charging coil configured to generate induced electromotive force by interlinkage of a magnetic field from an external charger coil with the charging coil, a battery to be charged with the induced electromotive force, a display including a display region, a position that coincides with the center of the charging coil being located inside an outline of the display region in plan view, and an operation unit, the control program causing the electronic device to execute the steps of:

displaying, in the display region, a charging screen including a letter or a figure that indicates the center of the charging coil in the position when an operation is performed on the operation unit while the battery is charged with the induced electromotive force; and causing only part of the display region to display a letter and a figure indicating that charging is performed with the induced electromotive force when charging is performed with the induced electromotive force, and at least one processor maintains the display of the figure and ends the display of the letter after a lapse of a predetermined period of time.

* * * * *